March 11, 1947. D. G. GRISWOLD 2,417,357
ANTI-SIPHON VALVE
Filed June 4, 1941
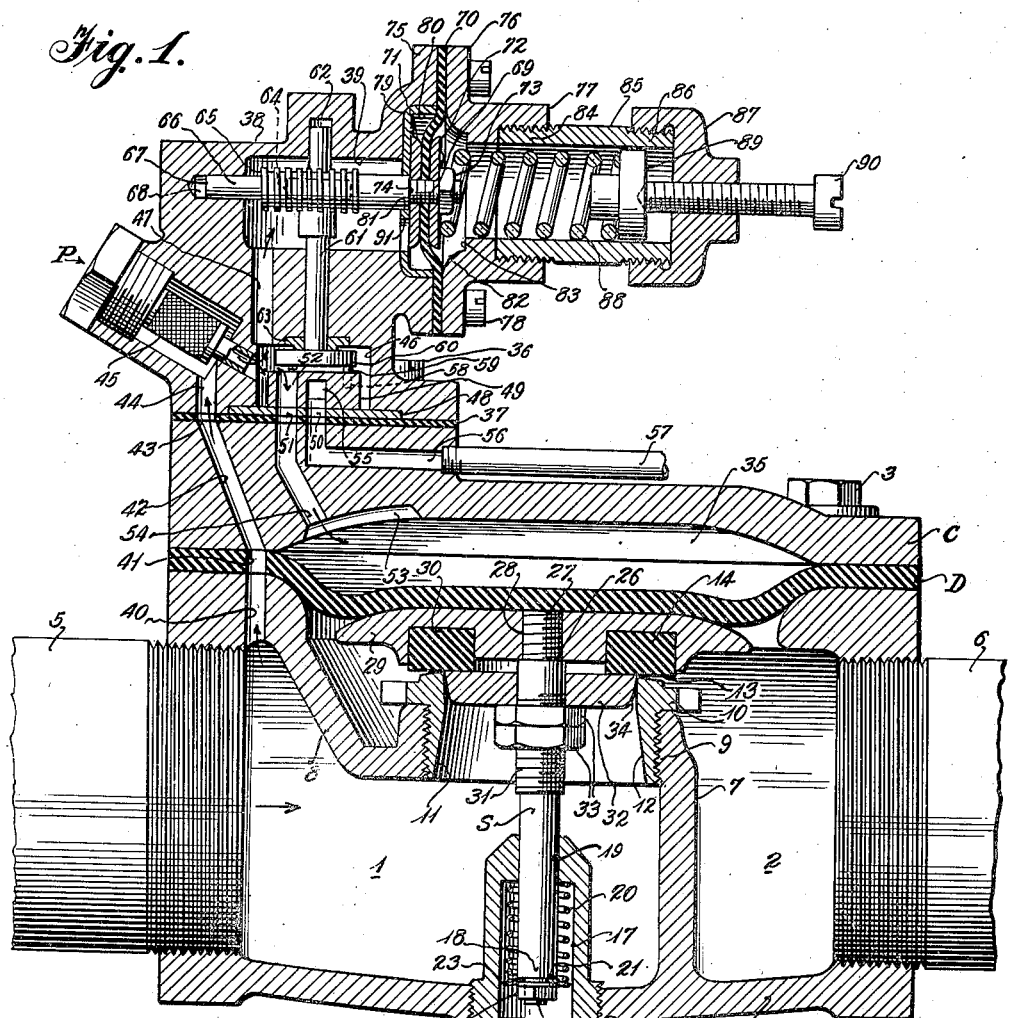
Fig. 1.
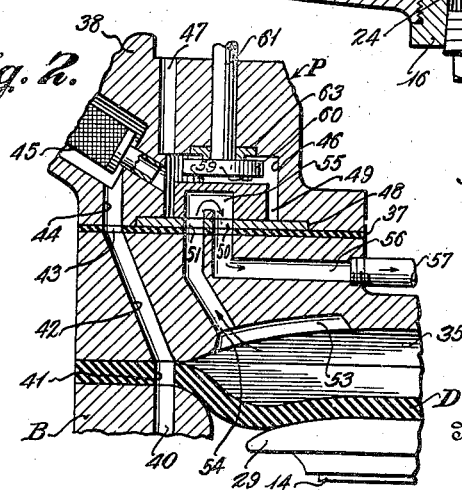
Fig. 2.
Fig. 3.
Inventor
Donald G. Griswold
By Bacon & Thomas
Attorneys Patented Mar. 11, 1947

2,417,357

UNITED STATES PATENT OFFICE 2,417,357

ANTISIPHON VALVE

Donald G. Griswold, Alhambra, Calif., assignor to Clayton Manufacturing Company, Alhambra, Calif.

Application June 4, 1941, Serial No. 396,629

5 Claims. (Cl. 137—53)

This invention relates to valves, and more particularly to non-return flow or anti-siphon valves.

More specifically, the invention relates to an automatic valve of the diaphragm type constructed and arranged so as to preclude contamination of the water in a pipe system by a siphon action or return-flow through the valve.

Conventional, known diaphragm valves have a diaphragm connected with the valve stem and/or the valve disc so that, if the pressure on the outlet side exceeds that on the inlet side, an upward force is exerted on the diaphragm by the fluid in said outlet side and the diaphragm then carries the valve stem and/or the valve disc upwardly with it away from the valve seat, thus holding or forcing the valve open and permitting return flow therethrough resulting in contamination of the pipe system on the inlet side of said valve.

In its broader aspects, the present invention comprises a diaphragm valve arranged so that, in the event that the pressure in the outlet side of the valve should, for any reason, exceed that in the inlet side of the valve, the pressure in said outlet side will be unable to open the valve through any upward pressure exerted on the diaphragm, thereby preventing a return flow through the valve and avoiding pollution of the fresh water in the pipe system.

In the specific case of an automatic pilot-controlled pressure relief valve of the diaphragm type having a stem and/or valve disc connected to the diaphragm, there is a possibility in some installations of a return flow through the valve should the pressure in the supply pipe to the valve fail or become less than that on the outlet side, even though the pilot disc may be positioned to admit operating fluid to the diaphragm chamber of the main valve for the purpose of actuating said diaphragm downwardly to effect closure of said main valve. Obviously, under such circumstances, there would be no available pressure in the inlet side of the main valve to close said valve and the pressure on the outlet side acting upwardly on the diaphragm would then tend to hold or lift the valve disc from its seat, thereby allowing an undesirable flow.

The principal object of the invention, therefore, is to provide a diaphragm type valve constructed so as to prevent any possible siphon action or return flow therethrough. This object is attained by providing a valve in which the diaphragm is free or unconnected with the valve stem and the valve disc. With such an arrangement, any pressure in the outlet opening acting upon the diaphragm will at most merely raise the diaphragm without tending to raise the valve disc from its seat. However, in order to provide some positive force effective at all times to seat the valve disc, a spring is associated with the valve stem so as to maintain the valve disc seated except at such times as the pressure in the inlet opening exceeds that in the outlet opening, or, in the particular case of a pressure relief valve, when the pressure in the inlet opening is also in excess of the predetermined pressure at which the valve has been set to open.

A further object of the invention is to provide an anti-siphon valve which is controlled automatically by a pilot valve in response to variations in pressure from a predetermined maximum pressure in the inlet opening of the main valve.

The foregoing and other objects and advantages of the invention will be apparent from the following description taken in conjunction with the accompanying drawings, in which:

Figure 1 is a transverse sectional view through the body of a main relief valve and a pilot valve for controlling the main valve, said main valve being in its closed position with the pilot disc and diaphragm of the pilot valve in a corresponding position;

Figure 2 is a fragmentary view of the valve shown in Figure 1 with the pilot disc positioned to allow opening of the main valve; and Figure 3 is an enlarged plan view of the pilot disc.

Referring now to Figure 1, the letter B indicates the body of the main valve and the numerals 1 and 2, respectively, indicate the inlet and outlet openings of the valve. The letter C indicates a cover for the main valve and the letter D indicates a circular diaphragm whose marginal portion is clamped between the body B and the cover C by any suitable number of cap screws 3. An inlet or supply pipe 5 is connected with the inlet opening 1 and an outlet or discharge pipe 6 is connected with the outlet opening 2.

The main valve body B is provided with a substantially vertical partition wall 7 which cooperates with an inclined partition 8 to provide in said body the inlet and outlet openings 1 and 2 previously referred to. The wall portions 7 and 8 are merged to provide a circular opening 9 which is threaded and adapted to receive an annular valve seat 10. The valve seat 10 is provided with a circular opening 11 which flares outwardly toward the bottom of the valve seat as indicated at 12. The upper surface of the valve seat 10 adjacent the opening 11 is provided with a declining beveled portion 13 adapted to cooperate with a valve disc 14 to form a leak-proof seal.

The main valve body B also has a threaded opening 15 axially aligned with the opening 11 in the valve seat 10. An elongated hollow plug 16 is threaded into the opening 15 and is provided with a chamber 17 adapted to receive one end 18 of a valve stem S. The valve stem S projects through a guide opening 19 in the plug 16 and is surrounded by a light spring 20. The lower extremity of the stem S is reduced to provide a shoulder 21 and is threaded as indicated at 22. A dished washer 23 engages the shoulder 21 and is secured in position by a nut 24 on the threaded portion 22. The washer 23 is engaged by one end of the spring 20 and the opposite end of said spring engages the bottom of the chamber 17 adjacent the opening 19. The spring 20 is under compression so that it tends to exert a downward pull on the valve stem S at all times. The open end of the chamber 17 is preferably closed by a plug 25.

The valve stem S is also reduced at its upper end to provide a shoulder 26 and a threaded portion 27. The portion 27 is screwed into a threaded opening 28 in a diaphragm supporting plate 29 until said plate abuts the shoulder 26. The valve disc 14 previously referred to is mounted in an annular groove 30 formed in the plate 29.

The valve stem S is still further provided with an intermediate threaded portion 31 which extends through a combined clamping member and choke washer 32. The choke washer 32 engages the inner marginal portion of the valve disc 14, and clamping nuts 33, threaded on the portion 31, serve to retain and lock the choke washer 32 and valve disc 14 in assembled relation with the stem S. The outer peripheral portion 34 of the choke washer 32 is rounded and tapered and fits closely within the opening 11 of the valve seat 10, the rounded and tapered portions cooperating with said valve seat to gradually and quietly cut off flow through the valve.

The diaphragm D is not connected in any way with the valve stem S or its supporting plate 29, so that said diaphragm is free to move upwardly relative to said supporting plate without any tendency to open the valve. The diaphragm D is arranged to cooperate with the cover C to provide a pressure chamber 35 for diaphragm operating fluid.

The pilot valve, generally indicated by the letter P, is mounted on the cover C by any suitable number of cap screws 36. A gasket 37 is clamped between the pilot valve and the cover to prevent leakage therebetween.

The pilot valve comprises a housing 38 containing a main pressure chamber 39 which is continuously subject to the pressure of the fluid in the inlet chamber I of the main valve B, the fluid being conducted from said inlet chamber through a passageway 40 in the body B, an opening 41 in the diaphragm D, a passageway 42 in the cover C, an opening 43 in the gasket 37, a passageway 44 in the housing 38, through a strainer 45 into a pilot disc chamber 46 and thence through a passageway 47 into the main pressure chamber 39. The strainer 45 prevents the operating fluid from carrying foreign matter into the pilot valve and thus assures trouble-free operation and non-clogging of said pilot valve.

The pilot disc chamber 46 is formed at the lower end of the pilot valve housing 38 and the open end of said chamber is closed by a plate 48 serving as the seat for a pilot valve disc 49. The plate 48 may be secured to the pilot valve housing in any convenient manner. This plate is provided with a central port 50 and a port 51 spaced a predetermined radial distance from the port 50. The gasket 37, of course, is provided with openings that register with the ports 50 and 51, respectively.

As shown in Figure 1, the pilot valve disc 49 is provided with a through passageway 52 adapted to place the pilot disc chamber 46 in communication with the diaphragm chamber 35 of the main valve. The under side of the cover C is provided with a groove 53 which connects with the port 51 through a passage 54 so as to assure entrance of operating fluid into the main diaphragm chamber 35 to effect closing of the valve even though the diaphragm should happen to be in contact with the upper wall surface defining said chamber.

The pilot disc 49 is also provided with a U-shaped passageway 55 arranged so that, when said pilot disc assumes the position shown in Figure 2, it will establish communication between the ports 50 and 51 and thus permit the escape of spent operating fluid from the diaphragm pressure chamber 35. A passageway 56 for exhaust fluid is accordingly provided in the cover C, and one end of said passageway is arranged to exhaust to the atmosphere or into a drain through a tube 57.

The pilot disc 49 is further provided with apertures 58 adapted to receive pins 59 depending from a drive washer 60. The drive washer 60 is mounted upon one end of a vertical shaft 61, the opposite end of the shaft being journaled in a recess 62 formed in the pilot valve housing 38. The end of the shaft 61 adjacent the drive washer 60 is guided by a bushing 63.

A spur gear 64 is fixedly secured to the shaft 61 and is arranged to mesh with annular ridges or teeth 65 formed upon a reciprocable rod 66 extending at right angles to the shaft 61. The rod 66 is disposed in front of the shaft 61, as viewed in Figure 1. One end 67 of the rod 66 is guided in a recess 68 in the pilot valve housing 38 and the opposite end 69 of said rod is reduced and threaded and connected with a flexible pilot diaphragm 70. Clamping plates 71 and 72 are disposed upon opposite sides of the pilot diaphragm 70 and a nut 73 clamps the diaphragm between said plates, one of said plates abutting a shoulder 74 on the rod 66.

The marginal portion of the pilot diaphragm 70 is disposed between a flange 75 formed at one side of the pilot valve housing 38 and a flange 76 formed upon a fitting 77. Cap screws 78 secure the fitting 77 to the housing 38 and serve to clamp the diaphragm 70 in position.

The portion of the pilot valve housing 38 adjacent the flange 75 is provided with a cavity 79 in which a cup-shaped stop element 80 is mounted. The stop element 80 is provided with a central opening 81 through which the rod 66 slidably extends. The fitting 77 is also provided with a cavity 82 having a bottom constituting a shoulder 83. When the main valve shown in Figure 1 is in its closed position, the plate 71 engages the bottom of the cup-shaped stop element 80, and when the main valve is opening or is in its fully opened position, the other washer 72 engages the shoulder 83. Thus, the travel of the rod 66 is limited in both directions.

The fitting 77 is adapted to receive one end 84 of a threaded pipe nipple 85. The opposite end 86 of said nipple is threaded to receive a cap member 87. A spring 88 is received in the pipe nipple 85 and one end of said spring engages the adjacent washer 72 and the opposite end of said spring engages a circular plate 89 disposed within said nipple. An adjusting screw 90 is threadedly mounted in the cap 87 and engages the plate 89 to place any desired initial compression upon the spring 88 so that the main valve will remain closed until a predetermined pressure exists in the inlet opening 1.

The nipple 85 may be a standard pipe nipple, and hence comparatively cheap and readily available. The use of a standard pipe nipple as a chamber for the adjustable spring of the valve makes it possible to quickly provide chambers of various lengths to accommodate a considerable variety of spring lengths to meet various conditions encountered in practice.

The operation of the valve shown herein is as follows: Pressure fluid from the inlet chamber 1 of the main valve passes into the pilot disc chamber 46 and into the main pressure chamber 39 of the pilot valve housing 38 through the passages and openings and in the manner previously described herein. With the pilot disc 49 in the position shown in Figure 1, pressure fluid is free to pass through the port 52 of the pilot disc 49 and enter the diaphragm chamber 35 of the main valve to close the valve and maintain the valve disc 14 tightly against its seat 10. The valve will remain closed until the pressure in the inlet opening 1 closely approaches that for which the spring 88 has been adjusted. Should an increase in pressure above the predetermined maximum occur, it will be transmitted from the inlet opening 1 to the pilot pressure chamber 39, and through an opening 91 in the bottom of the cup-shaped stop member 80 to act directly against the diaphragm 70 of the pilot valve. Increased pressure on the pilot diaphragm 70 will then gradually cause the spring 88 to be compressed to the extent permitted by the shoulder 83, which limits the travel of the rod 66 in one direction as hereinbefore described. As the rod 66 moves toward the right from the position shown in Figure 1, the ridges or teeth 65 on said rod will cause the spur gear 64 to rotate the shaft 61 and thus turn the pilot disc 49 counterclockwise through the drive washer 60 and pins 59 to ultimately bring said pilot disc to the position shown in Figure 2, at which time the diaphragm pressure chamber 35 in the main valve will be opened to exhaust through the U-shaped passageway 55 in said pilot disc.

The release or exhausting of the pressure fluid from the main diaphragm chamber 35 allows the fluid in the inlet opening 1 to act against the choke washer 32 to lift the valve disc 14 from its seat 10 against the counteracting effect of the spring 28 to allow flow through the valve. The spring 28, as has been previously stated, is comparatively light, so that little pressure is required to overcome the same in effecting opening of the valve. The lifting of the valve disc 14 from its seat is accompanied by an upward movement of the supporting plate 29 for the diaphragm D so that spent operating fluid is more or less forced out of the main diaphragm chamber 35 during the opening movement of the main valve.

Should the pressure in the inlet chamber 1 of the main valve fail or decrease to the extent that it becomes less than that in the outlet chamber 2 of the valve, the pressure in the chamber 39 of the pilot valve housing will correspondingly drop or decrease so that the spring 88 can then return the rod 66 to its initial position, thereby returning the pilot disc 49 to the position shown in Figure 1 to bring about closing of the valve. However, under the conditions assumed, the pressure in the outlet chamber 2 will exceed that in the inlet chamber, and therefore, no pressure fluid will be available to pass through the port 52, the pilot disc 49 and into the main diaphragm chamber 35 to force the valve disc 14 to its seat. On the contrary, the result will be that the pressure in the outlet chamber 2 will tend to force the diaphragm D upwardly into contact with the cover C and at the same time will act downwardly upon the diaphragm supporting plate 29 pressing the valve disc 14 against its seat. In addition to such downward fluid pressure, the spring 28, acting on the valve stem S, will seat the valve disc 14 as soon as the pressure in the inlet opening 1 fails. In the foregoing manner, the valve disc 14 is immediately and positively seated and will prevent any siphoning action or return flow through the valve.

Inasmuch as the force required to rotate the pilot disc 49 is ordinarily no more than a few ounces, the pressure in the chamber 39 of the pilot housing can, therefore, closely approach that for which the spring 88 has been adjusted before the main valve will open, and the main valve is thus made very sensitive and accurate. Moreover, the travel of the rod 66 is comparatively short, and hence only a slight pressure in excess of that for which the spring 88 is set need be applied to effect complete opening of the valve. In one form of the invention, the shaft 61 need only be rotated through an angle of approximately 60° to displace the port 52 and position the U-shaped passageway 55 of the pilot disc 49 in registration with the port 51 in the valve seat 48.

Should the pressure in the inlet chamber 1 of the valve decrease during normal operation of the valve, it will be apparent that the spring 88 will return the valve disc 14 to its initial position, as described, but with an excess of pressure in the inlet opening 1, pressure fluid will flow through the pilot port 52 into the main diaphragm chamber 35 and force the valve disc 14 against its seat and thereby cut off any normal flow through the valve.

While the principles of the invention have been disclosed herein in connection with a pressure relief valve, it will be understood that this is for the sake of illustration only and not by way of limitation and that said principles may be variously applied without departing from the spirit of the invention.

I claim:

1. A pilot-controlled automatic pressure relief valve comprising: a main valve having a body provided with an inlet opening and an outlet opening; means in said body for controlling the flow between said openings; a cover and a main diaphragm assembled with said body, said diaphragm being free from direct connection with said flow control means; a diaphragm pressure chamber in said cover above said main diaphragm, the lower side of said diaphragm being exposed to the pressure of fluid in said outlet opening; a pilot valve housing; passage means in said body, cover and said pilot valve housing establishing communication between said inlet opening and said pilot valve housing for conducting operating fluid under pressure from said inlet opening into said pilot valve housing; other passage means in said cover for conducting fluid from said pilot valve housing into, and exhausting fluid from, said main diaphragm chamber during closing and opening of said main valve, respectively; a rotatable ported pilot disc in said pilot valve housing cooperable with said other passage means in said cover for controlling the admission of operating fluid into and the exhaust of spent fluid from said main diaphragm chamber in accordance with changes in pressure in said inlet opening; means responsive to the pressure in said inlet opening arranged to automatically rotate said pilot disc; and means continuously urging said flow control means toward closed position comprising a valve stem connected with said flow control means, a plug carried by said valve body, said plug having an opening through which one end of said valve stem projects and a spring operatively associated with said valve stem arranged to continuously exert a downward pull upon said valve stem.

2. A pilot-controlled automatic anti-siphon valve comprising: a main valve having a body provided with an inlet opening and an outlet opening; means in said body for controlling the flow between said openings; a cover and main diaphragm assembled with said body, said diaphragm being free from direct connection with said flow control means; a diaphragm pressure chamber in said cover above said main diaphragm, the lower side of said diaphragm being exposed to the pressure of fluid in said outlet opening; a pilot valve housing; passage means in said body, cover and said pilot valve housing for conducting operating fluid under pressure directly from said inlet chamber into said pilot valve housing; other passage means in said cover for conducting fluid from said pilot valve housing into, and exhausting fluid from, said main diaphragm chamber during closing and opening of said main valve, respectively; a rotatable, ported pilot disc in said pilot valve housing cooperable with said other passage means in said cover for controlling the admission of operating fluid into and the exhaust of spent fluid from said main diaphragm chamber in accordance with changes in pressure in said inlet opening; and means continuously urging said flow control means toward closed position comprising a valve stem connected with said flow control means, a plug carried by said valve body, said plug having an opening through which one end of said valve stem projects and a spring operatively associated with said valve stem arranged to continuously exert a downward pull upon said valve stem.

3. A one-way pilot-controlled valve comprising: a main valve having a body provided with an inlet opening and an outlet opening; means in said body for controlling the flow between said openings; a main diaphragm assembled with said body, said diaphragm being free from direct connection with said flow control means and having its lower side exposed to the pressure of fluid in said outlet opening and adapted to engage said flow control means; a diaphragm pressure chamber above said main diaphragm; a pilot valve housing; aligned passage means in said main valve body and said pilot valve housing for conducting operating fluid under pressure from said inlet opening into said pilot valve housing; other passage means within said main valve body for conducting fluid from said pilot valve housing into, and exhausting fluid from, said main diaphragm chamber during closing and opening of said main valve, respectively; a ported pilot disc in said pilot valve housing cooperable with said other passage means in said main valve body for controlling the admission of operating fluid into and the exhaust of spent fluid from said main diaphragm chamber in accordance with pressure changes in said inlet opening; and means continuously urging said flow control means toward closed position.

4. An anti-siphon valve comprising: a body having an inlet opening, an outlet opening and a seat between said openings; means cooperable with said seat for controlling the flow between said openings including a valve stem, a plate member, a valve disc carried by said plate member, and means securing said plate, stem and disc together; guide means for said stem; means cooperable with said valve stem for continuously urging said valve disc toward said seat; a cover member; a diaphragm between said valve body and cover member, said diaphragm cooperating with said cover member to provide a chamber above said diaphragm for operating fluid, the underside of said diaphragm being arranged to be exposed to the pressure of fluid in said outlet opening; and means for admitting operating fluid to and exhausting said fluid from said diaphragm chamber, said diaphragm being engageable with but free from direct connection with said plate, valve stem and valve disc, whereby said diaphragm can be urged downwardly to effect closing of said valve by the operating fluid, and be urged upwardly by pressure fluid in said outlet opening without tending to raise said valve stem and valve disc in the event that the pressure in said outlet opening exceeds that in said inlet opening.

5. An anti-siphon valve comprising: a body having an inlet opening, an outlet opening and a seat between said openings; means cooperable with said seat for controlling the flow between said openings including a valve stem, a plate member, a valve disc carried by said plate member, and means securing said stem, plate and disc together; a cover member; a diaphragm between said valve body and cover member, said diaphragm cooperating with said cover member to provide a chamber above said diaphragm for operating fluid, the underside of said diaphragm being arranged to be exposed to the pressure of fluid in said outlet opening; and means for admitting operating fluid into and exhausting said fluid from said diaphragm chamber, said diaphragm being engageable with but free from direct connection with said plate member, valve stem and valve disc, whereby said diaphragm can be urged downwardly to effect closing of said valve by the operating fluid, and be urged upwardly by pressure fluid in said outlet opening without tending to raise said valve stem and valve disc in the event that the pressure in said outlet opening exceeds that in said inlet opening.

DONALD G. GRISWOLD.

REFERENCES CITED

The following references are of record in the file of this patent:

UNITED STATES PATENTS

| Number | Name | Date |
| --- | --- | --- |
| 2,214,963 | Jurs | Sept. 17, 1940 |
| 1,945,680 | Fahrenkamp | Feb. 6, 1934 |
| 1,863,590 | Carlson | June 21, 1932 |
| 1,958,262 | Boland | May 8, 1934 |
| 573,788 | Linstrom | Dec. 22, 1896 |
| 2,047,581 | Grissett | July 14, 1936 |
| 2,047,750 | Smith | July 14, 1936 |
| 1,901,119 | Putnam | Mar. 14, 1933 |
| 595,061 | Gulland | Dec. 7, 1897 |